US006968156B2

(12) United States Patent
Sugaya et al.

(10) Patent No.: US 6,968,156 B2
(45) Date of Patent: Nov. 22, 2005

(54) WIRELESS TRANSMISSION METHOD AND WIRELESS TRANSMISSION APPARATUS (75) Inventors: Shigeru Sugaya, Kanagawa (JP); Takuji Maekawa, Kanagawa (JP); Shinichi Kuroda, Tokyo (JP); Hisaki Hiraiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 09/921,522

(22) Filed: Aug. 2, 2001

(65) Prior Publication Data

US 2002/0049040 A1    Apr. 25, 2002

(30) Foreign Application Priority Data

Aug. 2, 2000    (JP) ............................ P2000-234571

(51) Int. Cl.$^7$ ............................................. H04B 17/00
(52) U.S. Cl. .................. 455/67.11; 455/67.13
(58) Field of Search .................. 455/67.11, 67.13, 455/67.16; 370/333

(56) References Cited

U.S. PATENT DOCUMENTS

| 5,327,574 A | * | 7/1994 | Monma et al. ............. 455/403 |
| 5,757,813 A | | 5/1998 | Raith ........................ 714/708 |
| 6,456,627 B1 | * | 9/2002 | Frodigh et al. ............. 370/465 |

FOREIGN PATENT DOCUMENTS

| EP | 0 932 277 A2 | 7/1999 |
| EP | 0 939 510 A2 | 9/1999 |
| EP | 0 942 550 A1 | 9/1999 |
| JP | 11-252090 | 9/1999 |
| JP | 2001-111561 | 4/2001 |

OTHER PUBLICATIONS

Gubbi R: "Isochronous Service In Home Multimedia Networks", Communications, Computers and Signal Processing, 1999 IEEE Pacific Rim Conference on Victoria BC, Canada Aug. 22-24, 1999 Piscataway, NJ, USA, IEEE, US, Aug. 22, 1999, pp. 534-539, XP010356692, ISBN: 0-7803-5582-2.

* cited by examiner

Primary Examiner—Benny Q. Tieu
(74) Attorney, Agent, or Firm—Bell, Boyd & Lloyd LLC (57) ABSTRACT

A wireless transmission method is provided in which a wireless network is constructed by a plurality of wireless transmission apparatus, a predetermined wireless transmission band is reserved and data is transmitted by radio. According to the wireless transmission method an allowable transmission error rate can be anticipated, whereby information transmission based on the unnecessary reservation of a wireless transmission band can be removed. In a wireless transmission method in which a wireless network is constructed by a plurality of wireless transmission apparatus, a predetermined wireless transmission band is reserved and data is transmitted by radio, a desired quality in a wireless transmission is selected by an arbitrary wireless transmission apparatus of a plurality of wireless transmission apparatus and a necessary wireless transmission band is reserved.

6 Claims, 8 Drawing Sheets

| Identifier | Transmitting Station Information | Receiving Station Information | Desired Communication Quality Information |
|---|---|---|---|

FIG. 8B

| Identifier | Transmitting Station Information | Receiving Station Information | Desired Modulation System/Coding Ratio Information | Transmission Error Occurrence Situation |
|---|---|---|---|---|

FIG. 8C

| Identifier | Transmitting Station Information | Receiving Station Information | Request Number | Available Bandwidth Information | Available Modulation System/Coding Ratio Information |
|---|---|---|---|---|---|

FIG. 8D

| Identifier | Transmitting Station Information | Receiving Station Information | Request Number | Channel Number | Available Bandwidth Information | Available Modulation System/Coding Ratio Information |
|---|---|---|---|---|---|---|

FIG. 8E

| Identifier | Transmitting Station Information | Receiving Station Information | Channel Number | Available Bandwidth Information | Available Modulation System/Coding Ratio Information |
|---|---|---|---|---|---|

FIG. 8F

| Identifier | Transmitting Station Information | Receiving Station Information | Channel Number | Available Bandwidth Information | Available Modulation System/Coding Ratio Information |
|---|---|---|---|---|---| ure
WIRELESS TRANSMISSION METHOD AND WIRELESS TRANSMISSION APPARATUS

BACKGROUND OF THE INVENTION

1. Field of Invention

The present invention relates to a wireless transmission method of constructing a wireless network comprised of a plurality of wireless transmission apparatuses and in which a wireless transmission is executed by reserving a predetermined wireless transmission band, a wireless transmission apparatus for constructing a wireless network, and a wireless transmission apparatus for reserving a predetermined wireless transmission band.

2. Description of the Related Art

At present, the wireless 1394 standards based on the high-speed serial bus standard IEEE 1394–1995 is relied upon to construct networks effectively utilizing radio waves.

According to the wireless 1394 standards format, a wireless transmission method is proposed in which a predetermined transmission band is reserved such that a band-reserved wireless transmission line can be used with priority. The band-reserved wireless transmission line is equivalent to a predetermined time slot reserved in the case of a time-division multiplex transmission line.

Further, Japanese patent application No. 10-47230 discloses a wireless transmission method in which a predetermined frame period is set to a wireless transmission line so that a constant area within the frame period can be used with priority.

According to the above wireless 1394 format, different modulation systems and convolutional coding ratios can be used in transmissions among respective wireless transmission apparatuses (stations) depending on the need. Therefore, even when an isochronous transmission, which is a band reserve transmission, is carried out, the band to be reserved changes depending upon the modulation system and the convolutional coding ratio needed fore transmission. That is, it becomes possible to improve the utilization efficiency of a transmission line by using a highest-speed modulation system and a coding ratio by which it becomes possible to carry out an isochronous transmission between a transmission source and a receiving destination.

Further, according to Japanese patent application No. 11-285744 (not laid-open as of filing of the present application), when the present invention is filed, a method is proposed in which the reserved band of a band-reserved wireless transmission is adjusted in response to a predetermined error occurrence situation for a band-reserved wireless transmission in which a predetermined band reservation was carried out.

Isochronous transmissions using radio waves require a method for reserving a frequency band for the isochronous transmission. However, the wireless 1394 standard has established a plurality of modulation systems and convolutional coding ratios. Because of the multiplicity of modulation systems and convolutional coding ratios it is difficult to judge the optimum modulation system and coding ratio, and it becomes difficult in practice to reserve a band by only a low-order layer.

Further, once a band has been reserved, defects frequently occur in the information transmission due to the selected modulation system and the coding ratio and changes in the transmission line. For this reason, transmissions should be monitored to determine whether a predetermined transmission quality is satisfied. If the predetermined transmission quality is not satisfied, it may become necessary to adjust the reserved band amount by changing the modulation system and the coding ratio that have been used.

Although the above Japanese patent application No. 11-285744 describes a method for adjusting the reserved band for a band-reserved wireless transmission, the Japanese application does not concretely describe a predetermined error detection method and a judging method for adjusting a band-reserved wireless transmission band.

If an allowable transmission error occurrence situation is not clear for a band-reserved wireless transmission, even when a momentary error occurs in the information transmission over a long period of time, there is the risk that an additional band-reserved wireless transmission band will be reserved.

SUMMARY OF THE INVENTION

In view of the aforesaid background, a wireless transmission method is provided in which a wireless network is constructed including a plurality of wireless transmission apparatuses, a predetermined wireless transmission band is reserved, and a wireless transmission is carried out. An object of the present invention is to provide a wireless transmission method in which an allowable transmission error rate can be determined in advance, whereby an unwarranted transmission of information caused when a transmission band is reserved unnecessarily can be avoided.

The present invention provides a wireless transmission method for use in a wireless network including a plurality of wireless transmission apparatuses, wherein a predetermined wireless transmission band is reserved and a wireless transmission is carried out. An object of the present invention is to provide a wireless transmission method in which an additional wireless transmission band can be reserved in order to use a more reliable modulation system and coding ratio as needed.

Further, in a wireless transmission method according to the present invention, in which a wireless network is provided including a plurality of wireless transmission apparatuses and in which a predetermined wireless transmission band is reserved and a wireless transmission is carried out, an object of the present invention to provide a wireless transmission method in which a wireless transmission band can be reserved according to the need.

Further, in a wireless transmission method according to the present invention, a wireless network is construed including a plurality of wireless transmission apparatus, a predetermined wireless transmission band is reserved and a wireless transmission is carried out. An object of the present invention is to provide a wireless transmission method in which, when a predetermined transmission quality is not satisfied, a wireless transmission band can be reserved as necessary.

Further, in a wireless transmission apparatus in which a wireless network is constructed and in which a predetermined wireless transmission band is reserved, an object of the present invention is to provide a wireless transmission apparatus in which an allowable transmission error rate can be set.

Further, in a wireless transmission apparatus in which a wireless network is constructed and in which a predetermined wireless transmission band is reserved, an object of the present invention is to provide a wireless transmission apparatus in which a predetermined transmission error situation is reported as necessary.

Further, in a wireless transmission apparatus in which a wireless network is constructed and in which a predetermined wireless transmission band is reserved, it is an object of the present invention to provide a wireless transmission apparatus in which a modulation system and a convolutional coding ratio which serve as parameters for use in a wireless transmission can be determined.

Further, in a wireless transmission apparatus in which a wireless network is constructed and in which a predetermined wireless transmission band is reserved, it is an object of the present invention to provide a wireless transmission apparatus in which a request for an additional band reserve allocation can be issued when necessary for a band reserve transmission.

Further, in a wireless transmission apparatus in which a wireless network is constructed and in a wireless transmission apparatus acting as a control station in which a predetermined wireless transmission band is reserved and a wireless transmission is carried out, it is an object of the present invention to provide a wireless transmission apparatus acting as a control station in which a band reservation of a necessary wireless transmission band can be allocated.

According to a first embodiment of the invention, a wireless transmission method is provided in which a wireless network comprising a plurality of wireless transmission apparatuses is constructed, a predetermined wireless transmission band is reserved and a wireless transmission is carried out. In the method of this first embodiment a desired quality in a wireless transmission is selected and a necessary wireless transmission band is reserved by an arbitrary wireless transmission apparatus in a plurality of wireless transmission apparatuses.

A further aspect of this first embodiment of a wireless transmission apparatus is to select the desired quality in the wireless transmission and reserve the necessary wireless transmission band by the arbitrary wireless transmission apparatus among the plurality of wireless transmission apparatuses.

In another aspect of this first embodiment of the invention, the desired quality in the wireless transmission is selected and the necessary wireless transmission band is reserved by an application of an arbitrary wireless transmission apparatus.

In a second embodiment of the invention a wireless transmission method is provided for use with a wireless network comprising a plurality of wireless transmission apparatuses. According to this embodiment, a transmission error occurrence situation is measured by a wireless transmission apparatus acting as a receiving station in a plurality of wireless transmission apparatuses and a transmission error occurrence situation based on the measured results is reported to an arbitrary wireless transmission apparatus other than the wireless transmission apparatus acting as the receiving station.

A further aspect of the second embodiment of the invention is a wireless transmission method in which a transmission error occurrence situation is reported to a wireless transmission apparatus acting as a reserving station of a band reserve transmission among the plurality of wireless transmission apparatuses. A modulation system and a convolutional coding ratio serving as parameters for use in transmission are determined by the wireless transmission apparatus acting as the reserving station and the necessary wireless transmission band is reserved.

Another aspect of this second embodiment of the invention is that a transmission error occurrence situation is reported to a wireless transmission apparatus acting as a control station among the plurality of wireless transmission apparatus, a modulation system and a convolutional coding ratio serve as parameters for use in transmission and are determined by the wireless transmission apparatus acting as the control station, and a necessary wireless transmission band is reserved.

Still another aspect of this embodiment of the invention is a wireless transmission method wherein a modulation system and a convolutional coding ratio serve as parameters for use in wireless transmission. A transmission error occurrence situation is reported to a wireless transmission apparatus acting as a transmitting station of a band reserve transmission among a plurality of wireless transmission apparatus. The wireless transmission apparatus acting as the transmitting station determines the modulation system and convolutional coding ratio parameters used in carrying out the wireless transmission, and a necessary wireless transmission band is reserved.

In another embodiment of the invention, a wireless transmission method is provided for use on a wireless network constructed from a plurality of wireless transmission apparatuses. A predetermined wireless transmission band is reserved and a wireless transmission is carried out. According to the wireless transmission method, a transmission error occurrence situation is measured by a wireless transmission apparatus serving as a receiving station among the plurality of wireless transmission apparatus. A modulation system and a convolutional coding ratio serving as parameters for use in wireless transmission are determined based on measured results and an arbitrary wireless transmission apparatus other than the wireless transmission apparatus acting as the receiving station among the plurality of wireless transmission apparatuses is informed of the modulation system and the convolutional coding ratio serving as the parameters thus determined.

In a further aspect of the above embodiment of a wireless transmission method a wireless the modulation system and the convolution coding ratio serving as the determined parameters are reported to a wireless transmission apparatus serving as a reserving station of a band reserve transmission among the plurality of wireless transmission apparatus and a necessary wireless transmission band is reserved by the wireless transmission apparatus acting as the reserving station.

Another aspect of the this embodiment of a wireless transmission method in which the determined modulation system and the convolutional coding ratio parameters are reported to a wireless transmission apparatus acting as a control station among the plurality of wireless transmission apparatuses, and a necessary wireless transmission band is reserved by the wireless transmission apparatus acting as the control station.

Still another aspect of a wireless transmission method according to this embodiment of the invention is that the modulation system and the convolutional coding ratio serving as the determined parameters are reported to a transmitting station of a band reserve transmission among the plurality of wireless transmission apparatuses, and a necessary wireless transmission band is reserved by the wireless transmission apparatus acting as the transmitting station.

Another embodiment of the invention provides a wireless transmission apparatus. The wireless apparatus includes a wireless network in which a predetermined wireless transmission band is reserved, and wherein the wireless transmission apparatus is adapted to set a desired transmission quality in a wireless transmission.

Another embodiment of a wireless transmission apparatus according to the present invention provides a wireless network in which a predetermined wireless transmission band is reserved. A reserving station is provided for carrying out a band reserving transmission. The wireless transmission apparatus includes a mechanism that receives an instruction from an application of the reserving station for setting a desired transmission quality based on the received instruction.

In yet another embodiment of the invention, a wireless transmission apparatus is provided in which a wireless network is constructed, a wireless transmission band is reserved and a wireless transmission is carried out. In a wireless transmission apparatus acting as a receiving destination wireless transmission apparatus a receiver is provided for receiving the wireless transmission. A wireless transmission apparatus is adapted to measure a transmission error occurrence situation and a transmitter is provided for reporting the transmission error occurrence situation based on the results measured.

Another aspect of this embodiment of a wireless transmission apparatus includes a mechanism that reports the transmission error occurrence situation measured by the transmission error occurrence measuring mechanism to an application of a wireless transmission apparatus acting as a reserving station for constructing a network and which carries out a band reservation.

A further aspect this embodiment of a wireless transmission apparatus includes a reporting mechanism for reporting the transmission error occurrence situation measured by the measuring mechanism to the wireless transmission apparatus constructing the wireless network and which acts as the control station.

Yet another feature of this embodiment of a wireless transmission apparatus includes a reporting mechanism for reporting the transmission error occurrence situation measured by the measuring mechanism to the wireless transmission apparatus which acts as the transmission source wireless transmission apparatus of the band reserve transmission.

In another embodiment of a wireless transmission apparatus in which a wireless network is constructed, a wireless transmission band is reserved and a wireless transmission is carried out. A wireless transmission apparatus acts as a receiving destination wireless transmission apparatus and includes a receiver for receiving the wireless transmission. A wireless transmission apparatus includes a mechanism by which a transmission error occurrence situation is measured. The transmission apparatus further includes a mechanism for determining the modulation system and convolutional coding ratio that serve as parameters for use in the wireless transmission, and an information transmitter for reporting the modulation system and the convolutional coding ratio serving as the determined parameters.

This embodiment further includes a reporting mechanism that reports the transmission error occurrence situation measured by the measuring mechanism to an application of a wireless transmission apparatus acting as a reserving station for constructing a network and which carries out a band reservation.

Another feature of this embodiment of the invention is a wireless transmission apparatus including a reporting mechanism for reporting the transmission error occurrence situation measured by the measuring mechanism to the wireless transmission apparatus constructing the wireless network and which acts as the control station.

Still another feature of this embodiment provides a wireless transmission apparatus that includes a reporting mechanism for reporting the transmission error occurrence situation measured by the measuring mechanism to the wireless transmission apparatus constructing the wireless network and which acts as the transmission source wireless transmission apparatus of the band reserve transmission.

Another embodiment of the invention provides a wireless transmission apparatus constructing a wireless network in which a predetermined wireless transmission band is reserved and a wireless transmission is carried out. Another aspect of this embodiment is a wireless transmission apparatus including a receiver that receives an error occurrence situation report in a band reserve transmission from a wireless transmission apparatus constructing a wireless network and which acts as a receiving destination wireless transmission apparatus and a request generator that requests a band reserve additional allocation based on the report thus received.

Still another embodiment of a wireless transmission apparatus constructing a wireless network and in which a predetermined wireless transmission band is reserved and a wireless transmission is carried out includes a wireless transmission apparatus adapted to execute a band reserve allocation of a necessary wireless transmission band.

DETAILED DESCRIPTION OF THE INVENTION

Figure 1:
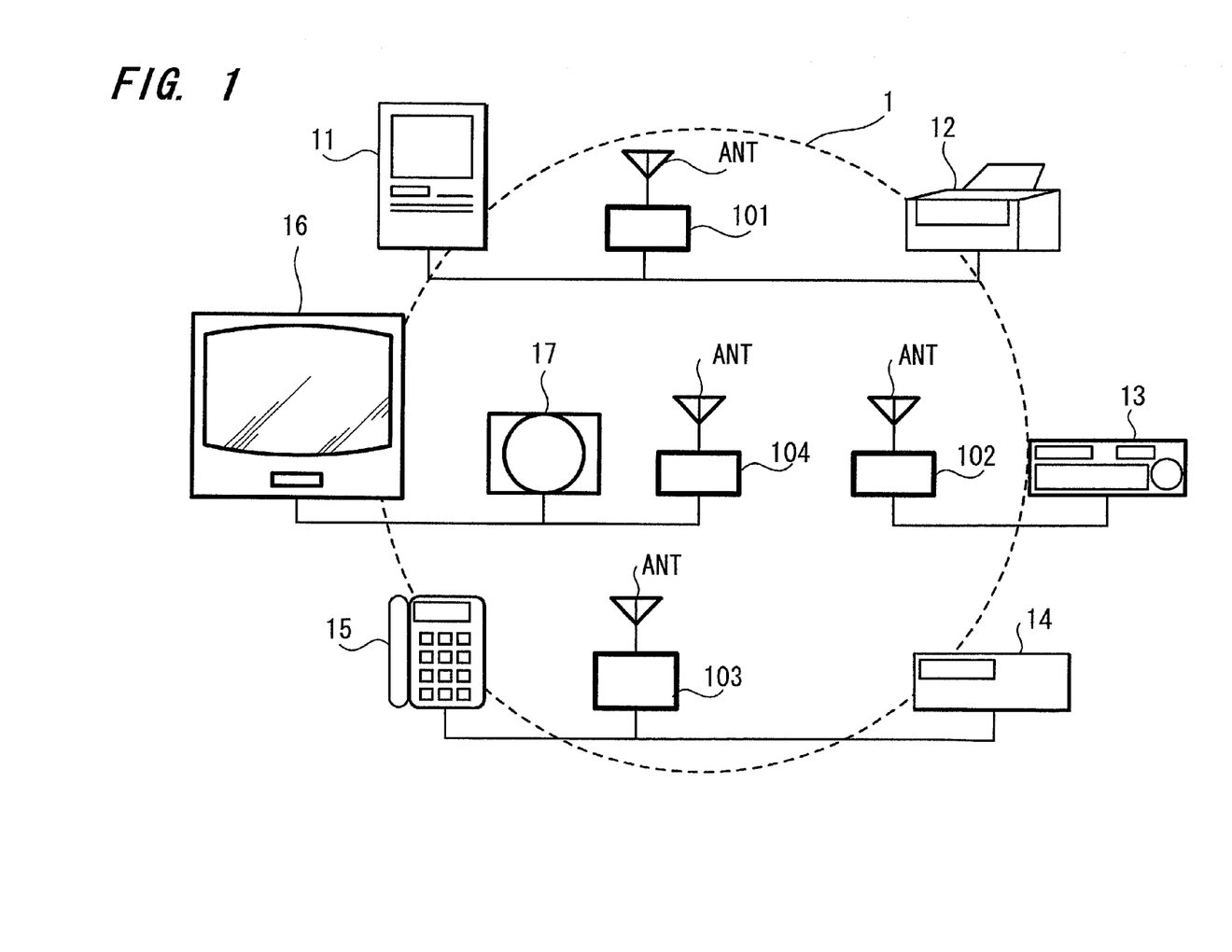
FIG. 1 is a block diagram showing an example of an arrangement of a wireless transmission frame which is applied to examples of a wireless transmission method and a wireless transmission apparatus according to an embodiment of the present invention.

FIG. 1 is a diagram showing an example of an arrangement of a network system to which are applied a wireless transmission method and a wireless transmission apparatus according to an embodiment of the present invention. The arrangement of this network system will be described below.

Reference numerals 101 to 104 denote wireless transmission apparatus comprising a wireless network 1. Each of the wireless transmission apparatus includes a transmitting and receiving antenna ANT. A personal computer 11 and an output printer 12, for example, are connected to the wireless transmission apparatus 101 with a cable. A VTR (digital video tape recorder) 13, for example, is connected to the wireless transmission apparatus 102 with a cable. A set-top box 14 and a telephone device 15, for example, are connected to the wireless transmission apparatus 103 with a cable. A television receiver 16 and a game device 17, for example, are connected to the wireless transmission apparatus 104 with a cable.

For convenience of explanation, the personal computer 11 acts as an owner (Owner) of isochronous transmission to inform a predetermined desired quality through the wireless transmission apparatus 101. The set-top box 14 acts as a talker (Talker) of isochronous transmission to transmit information through the wireless transmission apparatus 103. The VTR 13 acts as a listener (Listener) of isochronous transmission to receive information through the wireless transmission apparatus 102. As a consequence, predetermined band reservation transmissions are carried out from the wireless transmission apparatus 103 to the wireless transmission apparatus 105. These band reservation transmissions are managed by the transmission apparatus 104 which acts as a control station of the network.

Figure 2:
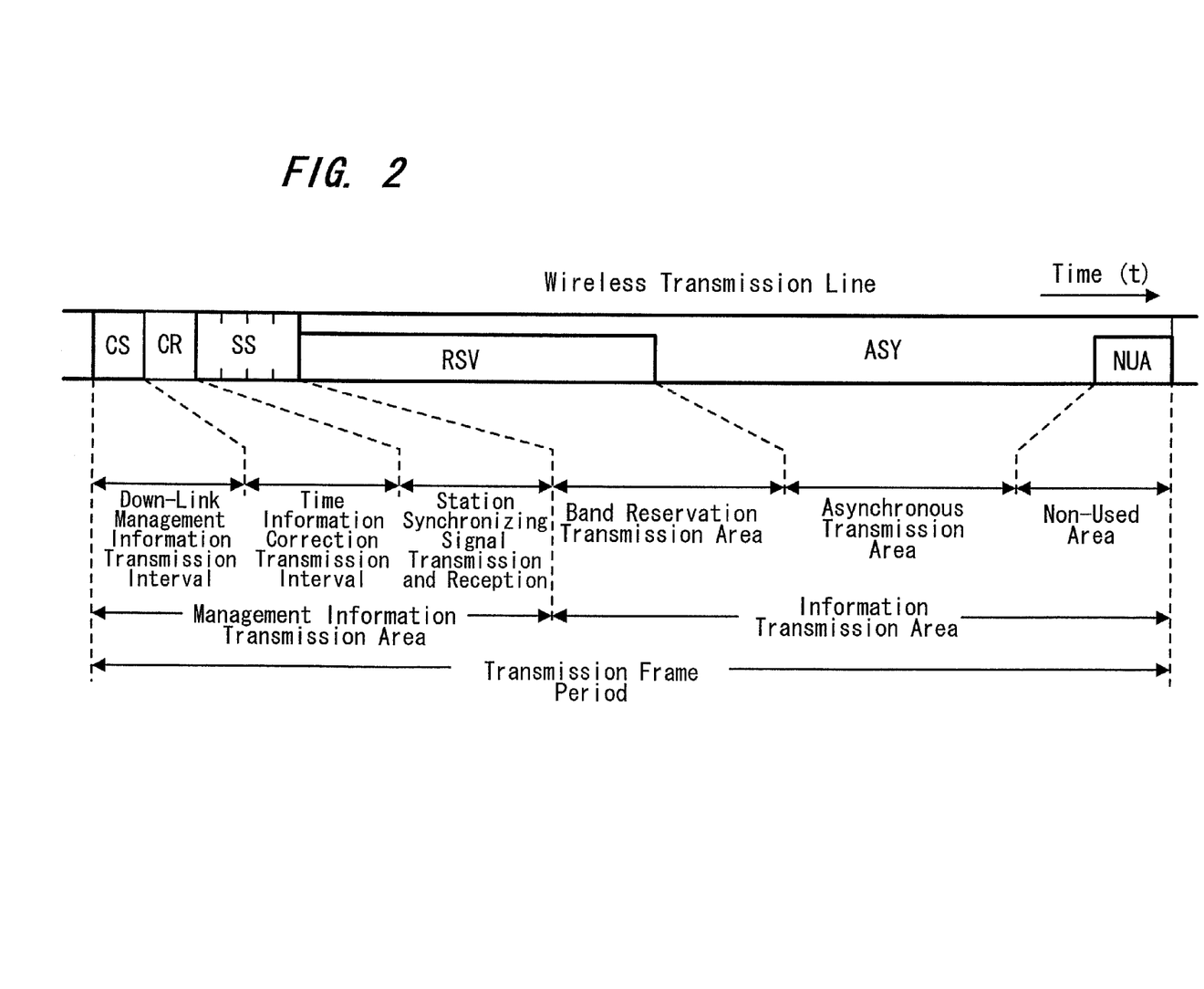
FIG. 2 is a diagram showing an example of an arrangement of a wireless transmission frame which is applied to a wireless transmission method and a wireless transmission apparatus according to an embodiment of the present invention.

FIG. 2 is a diagram showing an example of an arrangement of a transmission frame used in the examples of the wireless transmission method and the wireless transmission apparatus according to the embodiment of the present invention. The example of the arrangement of the transmission frame will be described below. While the frame is described by way of example, such frame structure need not always be prescribed.

FIG. 2 shows an example of the arrangement of the transmission frame in which the transmission frame is cyclically transmitted at fixed periods and in which the transmission frame comprises a management information transmission area and an information transmission area. A cycle start interval (CS) for reporting frame synchronization and network common information is located at the head of this frame. According to the need, there is set a cycle report interval (CR) which is followed by a station synchronizing transmission interval (SS).

The cycle start interval (CS) is used to transmit information that should be shared by the network from the control station. The cycle start interval (CS) includes a fixed length area and a variable length area.

The cycle start interval has the structure in which the fixed length area designates the number of communication stations transmitted within the station synchronizing transmission interval (SS) and the number of a band reserve transmission area (RSV) in order to specify the length of the variable length area. The variable length area designates communication stations transmitted within the station synchronizing transmission interval (SS) and also designates the band reserve transmission area (RSV).

The station synchronizing transmission interval (SS) has a predetermined length and based on down-link management information, may be assigned by the control station to each of the communication stations comprising the network. In addition, this assignment is repeatedly carried out toward each of the communication stations with a fixed period. Of this station synchronizing transmission interval (SS), if all portions except the transmission portion of its own station are received, then it is possible to understand the connection link state between it and the communication stations existing around its own station. Further, each communication station can understand the network connection station by reporting the situation of this connection link to the information which is to be transmitted during the station synchronizing transmission interval (SS) by its own next station.

The information transmission area includes the band reserve transmission area (RSV) set according to the need, an asynchronous transmission area (ASY) for centralized management in which transmission is controlled by the control station and a non-used area (NUA) for decentralized management in which transmission is not controlled by the control station. Specifically, since the band reserve transmission (RSV) and the non-used area (NUA) are not needed, the whole of the information transmission area can be transmitted as the asynchronous transmission area (ASY) for the centralized management.

With this frame structure, the isochronous (Isochronous) transmission prescribed by the IEEE 1394, for example, can be carried out in the band reserve transmission area, and the asynchronous (Asynchronous) transmission can be carried out in the asynchronous transmission area.

Further, in the examples of the wireless transmission method and the wireless transmission apparatus according to the embodiment of the present invention, while the band reserve transmission (RSV) is being carried out, when the communication quality is deteriorated as compared with a predetermined desired quality, additional bands are reserved in order to continue transmitting information with more reliable parameters (modulation system and coding ratio). Specifically, the non-used area (NUA) and the asynchronous transmission area (ASY) are used for the band added reserve transmission.

Figure 3:
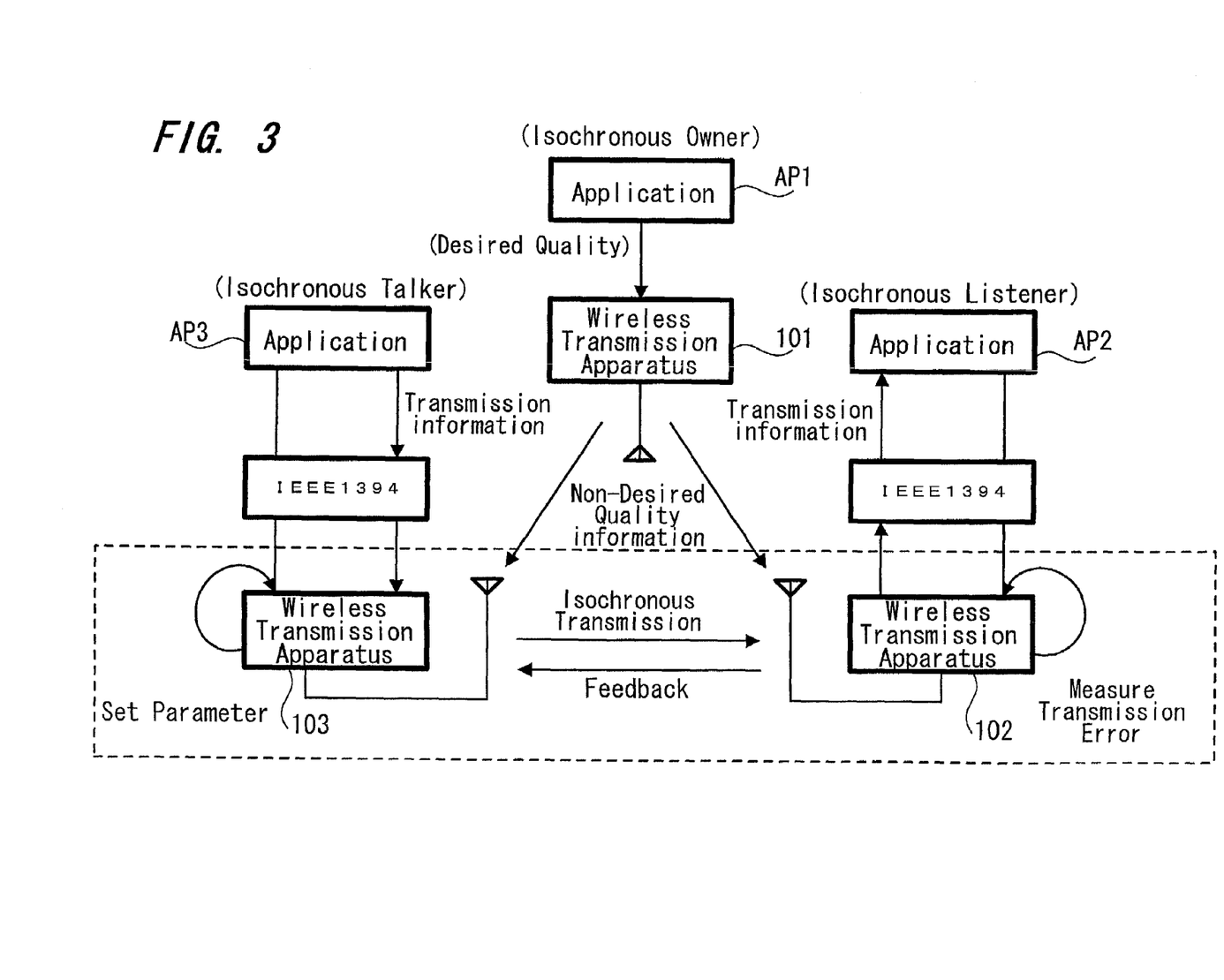
FIG. 3 is a block diagram showing an example of a schematic model of a layer structure of examples of a wireless transmission method and a wireless transmission apparatus according to an embodiment of the present invention.

FIG. 3 is a diagram schematically showing, in the form of a layer structure, how the band reserve wireless transmission in the examples of the wireless transmission method and the wireless transmission apparatus according to the embodiment of the present invention is controlled. This control method will be described below. A predetermined desired quality is reported from an application AP1 (the personal computer 11 in FIG. 1) which acts as an owner of isochronous resources through the wireless transmission apparatus 101 to the transmission source (the wireless transmission apparatus 103 in FIG. 1) of the isochronous transmission and the reception destination (the wireless transmission apparatus 102 in FIG. 1).

Thereafter, a predetermined band reservation is executed between the owner and the control station (not shown). Then, in accordance with reserve parameters, an application AP3 (the set-top box 14 in FIG. 1) of a talker of the isochronous transmission starts transmitting information based on the IEEE 1394 standard so that isochronous transmission information is transmitted to the wireless transmission apparatus 103.

Then, the isochronous transmission is carried out between the wireless transmission apparatus 103 and the wireless transmission apparatus 102, whereby transmission information is sent to an application AP2 (the VTR 13 in FIG. 1) of a listener based on the IEEE 1394 standard.

In the examples of the wireless transmission method and the wireless transmission apparatus according to the embodiment of the present invention, the wireless transmission apparatus 102 measures the situation in which transmission errors occurred in the received information, compares measured results with the foregoing desired quality and feeds back compared results to other wireless transmission apparatus.

The wireless transmission apparatus, which had received this feedback report, may have such an arrangement as to change the setting of parameters (modulation system and coding ratio) in order to carry out the information transmission which can satisfy the desired quality according to the need. Specifically, there is provided an isochronous transmission which can satisfy a desired quality of a high-order (application) layer by effecting control between the wireless transmission apparatus 102 and 103 encircled by a broken line in FIG. 3.

While the feedback report was sent to the wireless transmission apparatus 103 which acts as the talker of the isochronous transmission, the transmission apparatus 103 was designated as the talker merely for convenience of explanation, the present invention is not limited to this arrangement. Variants are also possible such that the feedback report is sent to the owner (reserved station) of the isochronous transmission and the control station.

In order to be able to carry out the information transmission satisfying the desired quality in the wireless transmission apparatus 102 acting as the listener of the isochronous transmission may be notified of the desired modulation systems and convolutional coding ratios parameters.

Figure 4:
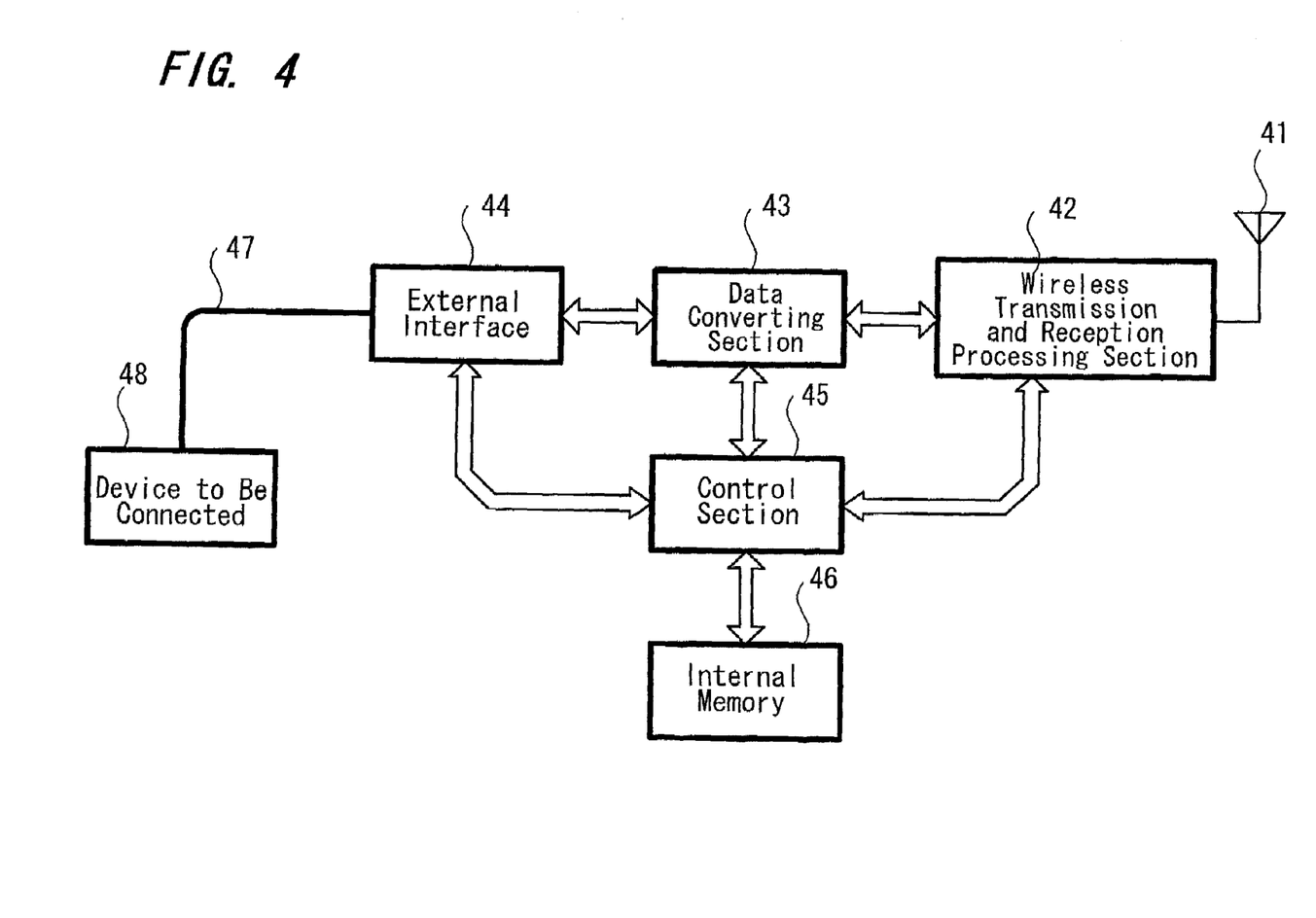
FIG. 4 is a block diagram showing an example of an arrangement of a wireless transmission apparatus according to an embodiment of the present invention.

FIG. 4 shows an example of an arrangement of the wireless transmission apparatus 101 to 104 comprising the respective communication stations described in FIG. 1. The example of the arrangement of the wireless transmission apparatus will be described below. Fundamentally, each of the wireless transmission apparatus 101 to 104 has a common arrangement and includes an antenna 41 (corresponding to the antenna ANT in FIG. 1) for transmitting and receiving information. The wireless transmission apparatus 101 to 104 further include a wireless transmission and reception processing section 42 connected to antenna 41 to carry out wireless transmission processing, and wireless reception processing. Thus, each wireless transmission apparatus can carry out wireless transmission between itself and other wireless transmission apparatus.

In this case, as a transmission system by which this wireless transmission and reception processing section 42 may transmit and receive information, there can be applied a transmission system based on a multicarrier signal which is referred to as an OFDM (Orthogonal Frequency Division Multiplex: orthogonal frequency division multiplex) system, for example. Very high frequency bands (e.g., 5 GHz band) can be used in transmission and reception.

A transmission output of the wireless transmission apparatus according to this embodiment is set to a relatively low output to an extent that a wireless transmission can be made between points distant from each other by a relatively short distance ranging from several meters to several 10s of meters when this wireless transmission apparatus is used indoors. The transmission output can be adjusted.

There is further provided a data converting section 43 for performing data conversion for signals received at the wireless transmission and reception processing section 42 and for performing data conversion for signals to be transmitted from the wireless transmission and reception processing section 42. The data converted by this data converting section 43 is supplied through an external interface section 44 to a connected device 48. Data supplied from the connected device 48 is supplied through the external interface section 44 to the data converting section 43.

The wireless transmission apparatus further includes, in addition to the external interface 44, an external interface capable of transmitting and receiving data on audio and video information and various data information to and from the connected device 48 through a high-speed serial bus 47 like an IEEE 1394 serial bus, for example.

The wireless transmission apparatus described so far with reference to FIG. 4 may be incorporated within the body of the connected device 48.

Each section of the wireless transmission apparatus is adapted to execute processing under control of a control section 45 formed of a microcomputer and the like. In this case, when a signal received at the wireless transmission and reception processing section 42 is a signal of a management area, the received signal is supplied through the data converting section 43 to the control section 45 so that the control section 45 may set each section to the state indicated by each received information.

An internal memory 46 is connected to this control section 45, and the internal memory 46 may temporarily store information indicative of methods for using the wireless network and a wireless transmission line, such as the number of communication stations comprising the network and band reserve information.

In the wireless transmission apparatus which acts as the control station of the network, a cycle start signal of a corresponding network is supplied from the control section through the data converting section 43 at a predetermined frame period to the wireless transmission and reception processing section 42, from which the cycle start signal may be transmitted by radio.

In the wireless transmission apparatus of the communication station which does not act as the control station of the network, when a received signal is the cycle start signal, the received signal is supplied through the data converting section 43 to the control section 45, whereby the control section 45 may judge the timing at which such a synchronizing signal is received and set a frame period based on the synchronizing signal. Accordingly, the control section 45 can execute the communication control processing at the frame period.

When a desired quality information packet is transmitted in the examples of the wireless transmission method and the wireless transmission apparatus according to the embodiment of the present invention, the control section 45 constructs information received from the application as an asynchronous transmission packet and supplies this asynchronous transmission packet through the data converting section 43 to the wireless transmission and reception processing section 42 by which the asynchronous transmission packet can be transmitted by radio in accordance with predetermined access control (e.g., in response to a polling signal which is transmitted to its own station).

When the signal received at the wireless transmission and reception processing section 42 is the asynchronous transmission packet which is related to the desired quality, the received signal is supplied through the data converting section 43 to the control section 45, in which it is stored in the internal memory 46 by the control section 45.

Upon isochronous transmission, when the signal received at the wireless transmission and reception processing section 42 is isochronous information, the above signal is decoded by the data converting section 43, the number of transmission error blocks is provided to the control section 45 and the transmission quality is monitored by the control section 45. When the monitored transmission quality does not satisfy the value of the desired quality stored in the internal memory 46, the above information is constructed as an asynchronous transmission packet defining parameter report that may be reported to other communication stations.

The contents of the parameter report include information such as situations under which errors occurred and the desired parameters (modulation system and convolutional coding ratio).

When the signal received at the wireless transmission and reception processing section 42 is the parameter report from the isochronous transmission receiving station, the received signal is supplied through the data converting section 43 to the control section 45, whereby the control section 45 may construct a band additional reserve request as an asynchronous transmission packet and transmit this asynchronous transmission packet.

In the wireless transmission apparatus which acts as the control station of the network, when a band additional reserve request is issued, the received signal is supplied through the data converting section 43 to the control section 45 so that, if an additional allocation is possible, then a band additional allocation may be carried out and each communication station may be informed of the additional band allocation.

Figure 5:
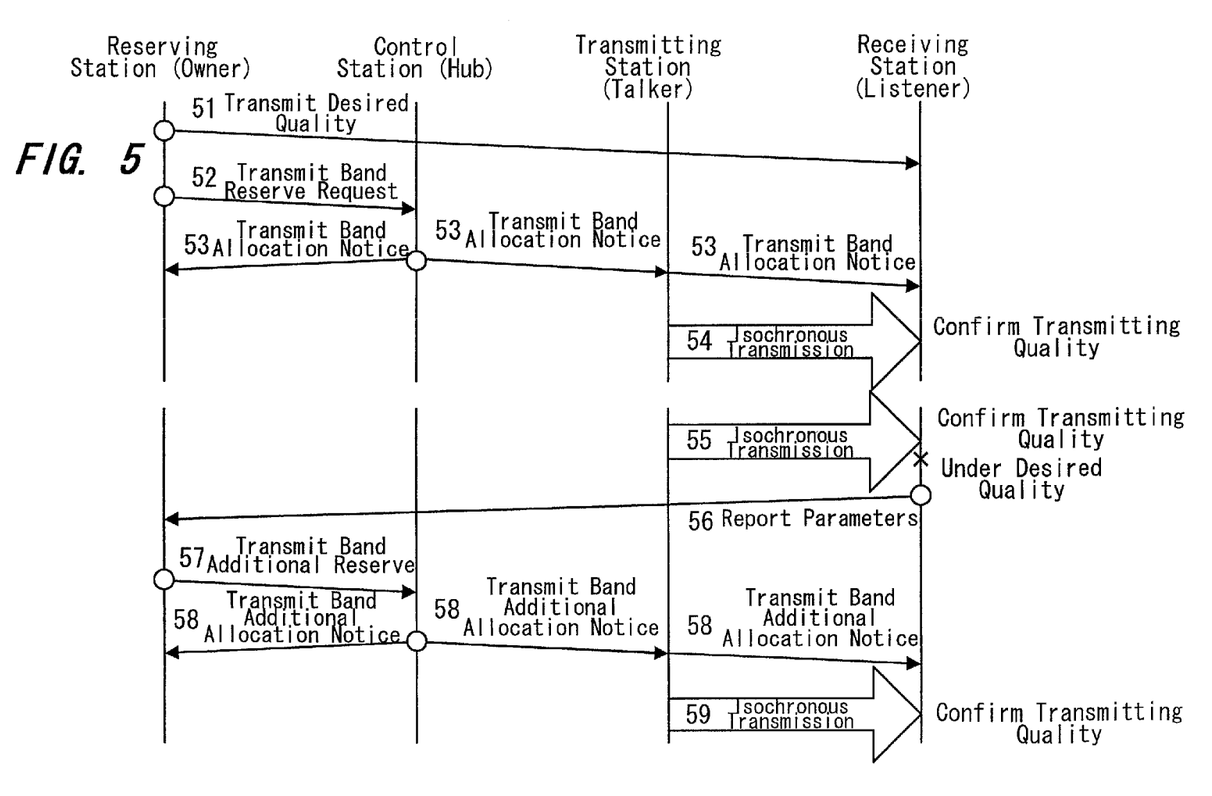
FIG. 5 is a sequence diagram showing an example of a sequence of a model in which information is fed from a receiving station (listener) back to a reserving station (owner) in the example of the wireless transmission method according to the embodiment of the present invention.

FIG. 5 shows an example of a sequence of a model in which information is fed from a receiving station (listener) back to a reserving station (owner). This example of the sequence of the model will be described below. First, a desired quality notice 51 is transmitted from the application of the reserving station (owner) to the receiving station (listener).

The reserving station (owner) decides parameters (modulation system, coding ratio and transmission power, etc.) used in transmission and transmits a band reserve request 52 to a control station (hub).

When the band allocation can be carried out in accordance with this request, the control station (hub) transmits a band allocation notice 53 to the reserving station (owner), the transmitting station (talker) and the receiving station (listener).

Then, the transmitting station (talker) transmits an isochronous transmission 54 to the receiving station (listener) and the receiving station (listener) confirms the transmission quality.

During an isochronous transmission 55, when the receiving station (listener) confirms a transmission quality, if transmission errors occur so that the transmission quality is deteriorated from the predetermined desired quality, then the receiving station (listener) transmits a parameter report 56 to the reserving station (owner).

When receiving the parameter report, the reserving station (owner) collects the information, determines the parameters used in transmission (modulation system, coding ratio, transmission power, etc.) and then transmits a band additional reserve request 57 to the control station (hub).

When the control station (hub) is able to allocate an additional band in accordance with this request, the control station transmits an additional band allocation notice 58 to the reserving station (owner), the transmitting station (talker) and the receiving station (listener).

Then, the transmitting station (talker) transmits an isochronous transmission 59 to the receiving station (listener) in accordance with the parameters and the receiving station (listener) confirms the transmission quality.

Figure 6:
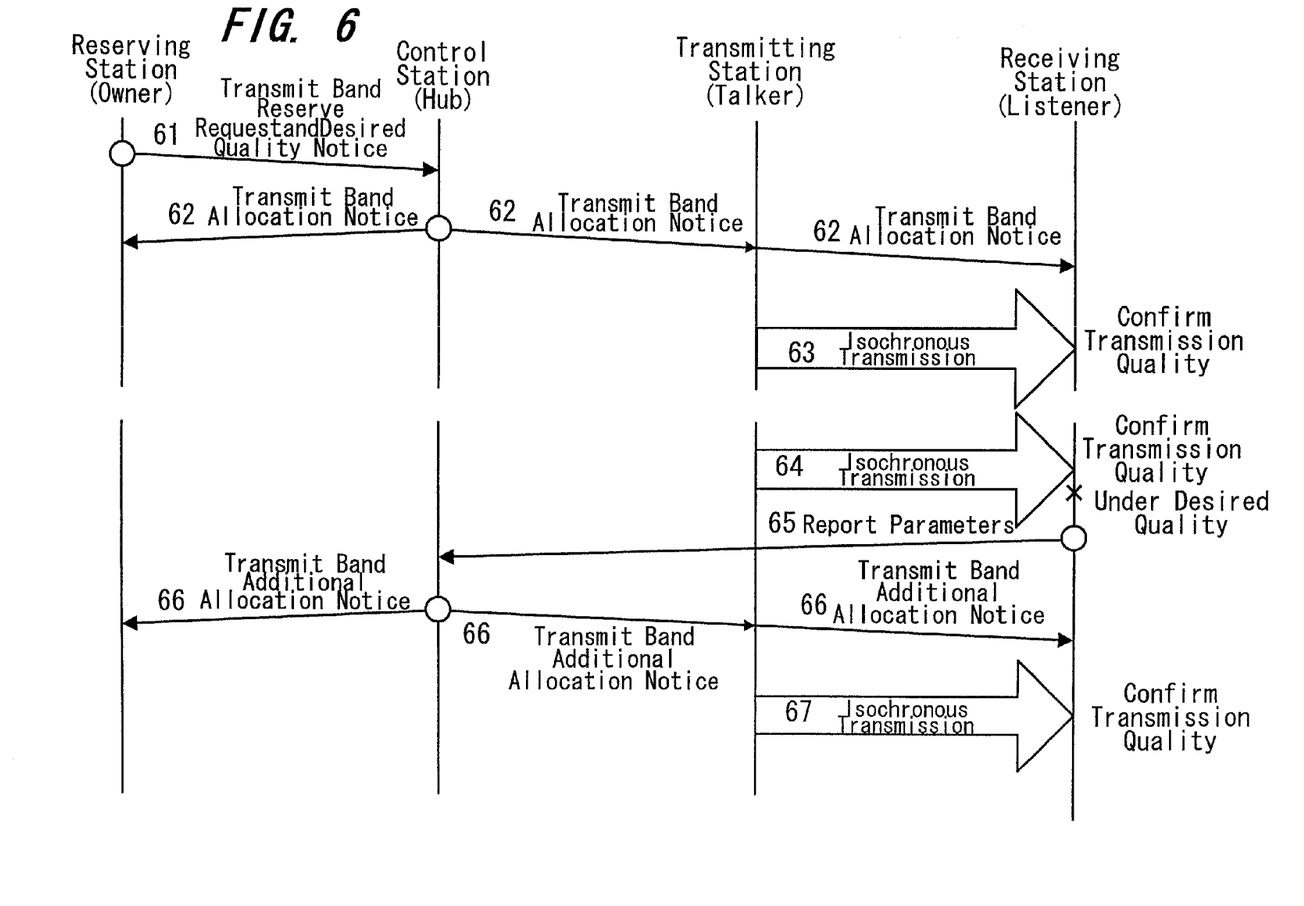
FIG. 6 is a sequence diagram showing an example of a sequence of a model in which information is fed from the receiving station (listener) back to a control station (hub) in the example of the wireless transmission method according to the embodiment of the present invention.

FIG. 6 shows an example of a sequence of a model in which information is fed from the receiving station (listener) back to the control station (hub). As illustrated, a band reserve request and desired quality notice 61 are transmitted from the application of the reserving station (owner) to the control station (hub).

When the control station (hub) is able to allocate a band in accordance with this request, the control station transmits a band allocation notice 62 to the reserving station (owner), the transmitting station (talker) and the receiving station (listener). At that time, the desired quality notice also is transmitted to the reserving station, the transmitting station and the receiving station.

Then, the transmitting station (talker) transmits an isochronous transmission 69 to the receiving station (listener) in accordance with the parameters and the receiving station (listener) confirms the transmission quality.

During the isochronous transmission 64, when the receiving station (listener) confirms the transmission quality, if transmission errors occur so that a transmission quality becomes deteriorated below the predetermined desired quality, then the receiving station (listener) transmits a parameter report 65 to the control station (hub).

When the control station (hub) is able to collect these information, decide parameters used in transmission (modulation system, coding ratio, transmission power, etc.) and additionally allocate a band in accordance with this request, the control station transmits an additional band allocation notice 66 to the reserving station (owner), the transmitting station (talker) and the receiving station (listener).

Then, the transmitting station (talker) transmits an isochronous transmission 67 to the receiving station (listener) in accordance with the parameters and the receiving station (listener) confirms the transmission quality.

Figure 7:
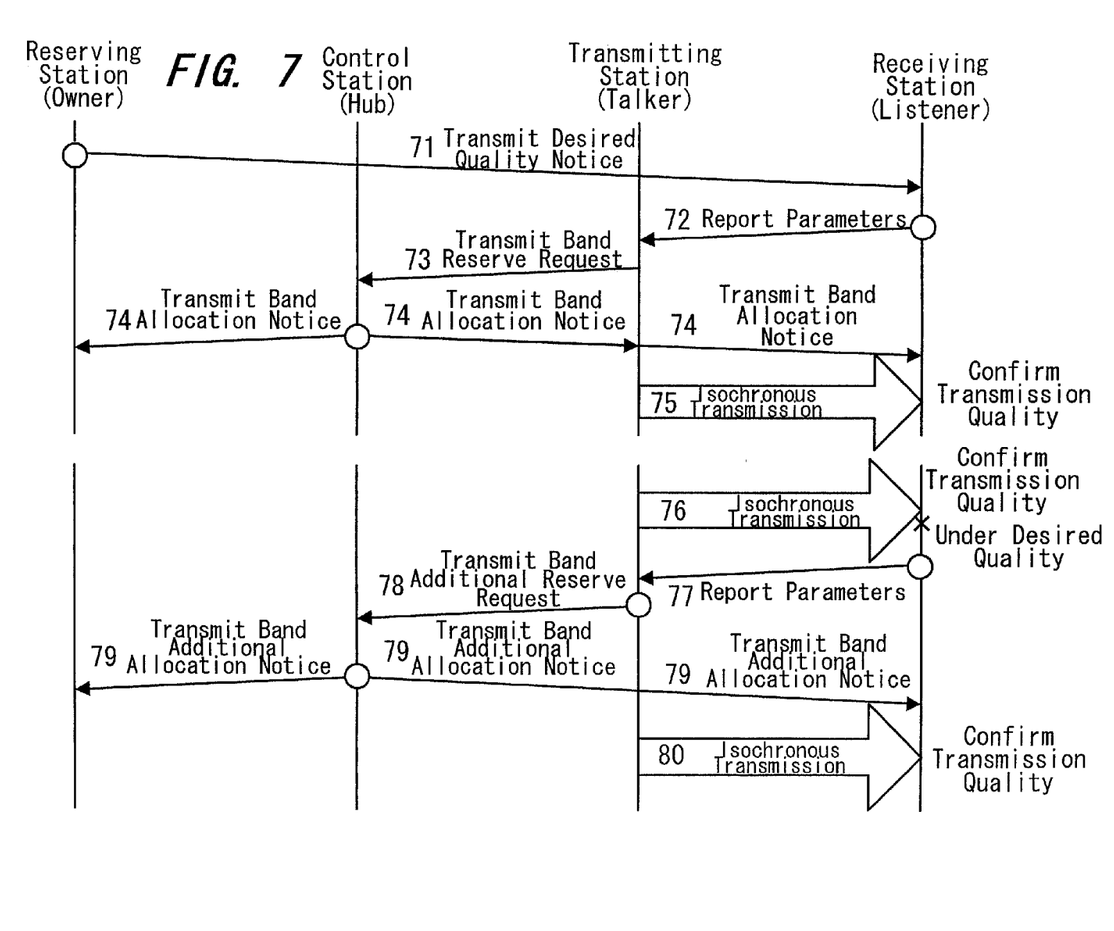
FIG. 7 is a sequence diagram showing an example of a sequence of a model in which information is fed from the receiving station (listener) back to a transmitting station (talker) in the example of the wireless transmission method according to the embodiment of the present invention.

FIG. 7 shows an example of a sequence of a model in which information is fed from the receiving station (listener) back to the transmitting station (talker). A desired quality notice 71 is transmitted from the application of the reserving station (owner) to the receiving station (listener).

Further, the receiving station (listener) transmits a wireless parameter (modulation system, coding ratio, etc.) report 72, which is desired to be used in transmitting information, to the transmitting station (talker) in order to achieve the desired quality.

In the case of a multicasting transmission in which there exist a plurality of receiving stations (listeners), the transmitting station (talker) collects this information, decides the parameters used in transmission (modulation system, coding ratio, transmission power, etc.) and then transmits a band reserve request 73 to the control station (hub).

When the control station (hub) is able to allocate a band in accordance with this request, the control station transmits a band allocation notice 74 to the reserving station (owner), the transmitting station (talker) and the receiving stations (listeners).

Then, the transmitting station (talker) transmits an isochronous transmission 75 to the receiving stations (listeners) in accordance with the above parameters and the receiving stations (listeners) confirm the transmission quality.

During an isochronous transmission 76, when the receiving stations (listeners) confirm transmission quality, if transmission errors occur so that the transmission quality becomes deteriorated as compared with a predetermined desired quality, then the receiving stations (listeners) transmit a parameter report 77 to the transmitting station (talker).

When receiving the parameter reports, the transmitting station (talker) collects the information, determines the parameters used in transmission (modulation system, coding ratio, electric power, etc.) and transmits an additional band reserve request 78 to the control station (hub).

When the control station (hub) is able to additionally allocate a band in accordance with this request, the control station transmits a band additional allocation notice 79 to the reserving station (owner), the transmitting station (talker) and the receiving stations (listeners).

Then, the transmitting station (talker) transmits an isochronous transmission 80 to the receiving stations (listeners) and the receiving stations (listeners) confirm the transmission quality.

FIG. 8 shows examples of arrangements of various packets used in the examples of the wireless transmission system and the wireless transmission apparatus according to an embodiment of the present invention. These examples of the arrangements will be described below.

Figure 8A:
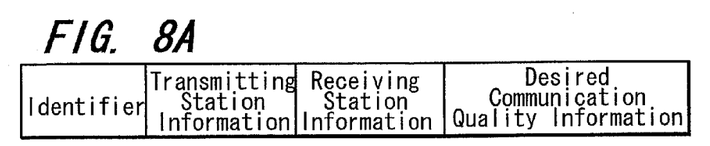
FIG. 8 is a diagram showing examples of arrangements of various packets useful for the examples of the wireless transmission method and the wireless transmission apparatus according to the embodiment of the present invention.

FIG. 8A shows an example of an arrangement of a packet exchanged as a desired quality notice. This desired quality notice packet is comprised of an "identifier" portion for identifying the present packet, a "transmitting station information" portion for representing an information transmitting source of a corresponding transmission, a "receiving station information" portion for representing an information receiving destination of a corresponding transmission, and a "desired communication quality information" portion designated by an application according to the need, etc.

Figure 8B:
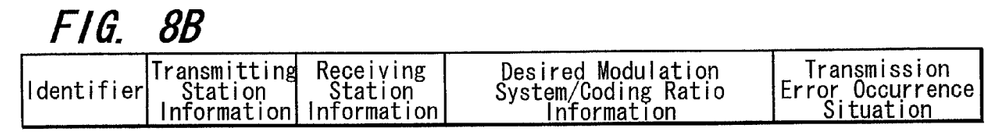

FIG. 8B shows an example of an arrangement of a packet exchanged as a parameter report. This parameter report packet is comprised of an "identifier" portion for identifying the present packet, a "transmitting station information" portion for representing an information transmitting source of a corresponding transmission, a "receiving station information" portion for representing an information receiving destination of a corresponding transmission, a "desired modulation system and coding ratio information" portion serving as the transmission parameters desired by the receiving station, and a "error occurrence situation" portion reported to other stations according to the need, etc.

Figure 8C:
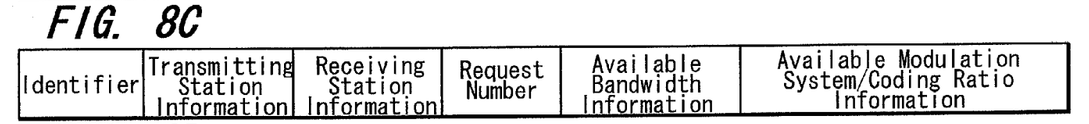

FIG. 8C shows an example of an arrangement of a packet exchanged as a band reserving request. This band reserve request packet is comprised of an "identifier" portion for identifying the present packet, a "transmitting station information" portion for representing an information transmitting source of a corresponding transmission, a "receiving station information" portion for representing an information receiving destination of a corresponding transmission, a "request number" portion added in response to the band reserve request, an "available bandwidth" of a bandwidth that should be reserved in band, "available modulation system and coding ratio information" serving as parameters useful for transmission, etc.

Figure 8D:
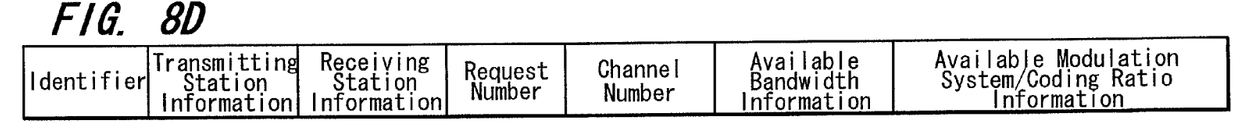

FIG. 8D shows an example of an arrangement of a packet exchanged as a band reserve allocation notice. This band reserve allocation notice packet is comprised of an "identifier" portion for identifying the present packet, a "transmitting station information" portion for representing an information transmitting source of a corresponding transmission, a "receiving station information" portion for representing an information receiving destination of a corresponding transmission, a "request number" portion added in response to a band reserve request, a "channel number" portion representing an allocated isochronous channel, an "available bandwidth" portion identifying a bandwidth that should be reserved in the band, and "available modulation system and coding ratio information" serving as parameters for use in transmission, etc.

Figure 8E:
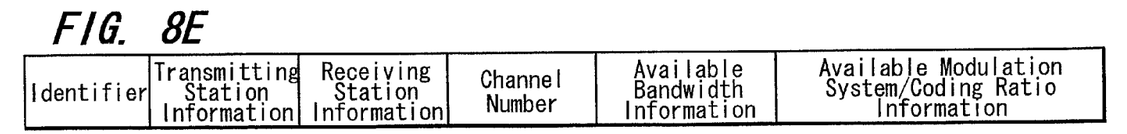

FIG. 8E shows an example of an arrangement of a packet exchanged as a band additional reserve request. This band additional reserve request packet is comprised of an "identifier" portion for identifying the present packet, a "transmitting station information" portion representing an information transmitting source of a corresponding transmission, a "receiving station information" portion for representing an information receiving destination of a corresponding transmission, a "channel number" portion representing an isochronous channel changed, an "available bandwidth" portion identifying a bandwidth that should be reserved in the band, and "available modulation system and coding ratio information" portion serving as parameters for use in transmission, etc.

Figure 8F:
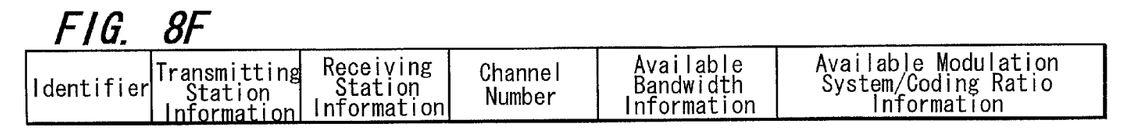

FIG. 8F shows an example of an arrangement of a packet exchanged as a band additional allocation notice. This band additional allocation notice packet is comprised of an "identifier" portion for identifying the present packet, a "transmitting station information" portion for representing an information transmitting source of a corresponding transmission, a "receiving station information" portion representing an information receiving destination of a corresponding transmission, a "channel number" portion representing an isochronous channel changed, an "available bandwidth" portion identifying a bandwidth that should be reserved in the band, and "available modulation system and coding ratio information" portion serving as parameters for use in transmission, etc.

The above parameters are not limited to those described above and may be adjusted according to the need. In addition to the above various packets, packets such as a packet for informing the fact that a band cannot be allocated, for example, may be defined according to the need.

According to a first aspect of the invention, in the wireless transmission method in which the wireless network comprised of a plurality of wireless transmission apparatus is constructed, the predetermined wireless transmission band is reserved and the wireless transmission is carried out, since the desired quality in the wireless transmission is selected and the necessary wireless transmission band is reserved by an arbitrary wireless transmission apparatus of a plurality of wireless transmission apparatus, the allowable transmission error rate can be learned in advance, thereby making it possible to obtain the wireless transmission method in which the information transmission based on the unnecessary reservation of the wireless transmission band can be avoided.

According to a second aspect of the invention, in the wireless transmission method of the first invention, since the desired quality in the wireless transmission is selected and the necessary wireless transmission band is reserved by the application of the arbitrary wireless transmission apparatus, the allowable transmission error rate can be learned in advance, thereby making it possible to obtain the wireless transmission method in which the information transmission based on the unnecessary reservation of the wireless transmission band can be avoided.

According to a third aspect of the invention, in the wireless transmission method in which the wireless network comprised of a plurality of wireless transmission apparatus is constructed, the predetermined wireless transmission band is reserved and the wireless transmission is carried out, since the transmission error occurrence situation is measured and the transmission error occurrence situation based on the measured results is reported to the arbitrary wireless transmission apparatus other than the receiving station among the plurality of wireless transmission apparatus by the wireless transmission apparatus serving as the receiving station among the plurality of wireless transmission apparatus, it is possible to obtain the wireless transmission method in which the wireless transmission band can be additionally reserved in order to use a more reliable modulation system and coding ratio according to the need.

According to a fourth aspect of the invention, in the wireless transmission method of the invention, since the transmission error occurrence situation is reported to the wireless transmission apparatus acting as the reserving station of the band reserve transmission of a plurality of wireless transmission apparatus, the modulation system and the convolutional coding ratio serving as the parameters for use in wireless transmission are decided and the necessary wireless transmission band is reserved by the wireless transmission apparatus acting as the reserving station, it is possible to obtain the wireless transmission method in which the wireless transmission band can be additionally reserved in order to use more reliable modulation system and coding ratio according to the need.

According to a fifth aspect of the invention, in the wireless transmission method of the invention, since the transmission error occurrence situation is reported to the wireless transmission apparatus acting as the control station of a plurality of wireless transmission apparatus, the modulation system and the convolutional coding ratio serving as the parameters for use in wireless transmission are decided and the necessary wireless transmission band is reserved by the wireless transmission apparatus acting as the control station, it is possible to obtain the wireless transmission method in which the wireless transmission band can be additionally reserved in order to use more reliable modulation system and coding ratio according to the need.

According to a sixth aspect of the invention, in the wireless transmission method of the invention, since the transmission error occurrence situation is reported to the wireless transmission apparatus acting as the transmitting station of the band reserve transmission of a plurality of wireless transmission apparatus, the modulation system and the convolutional coding ratio serving as the parameters for use in wireless transmission are decided and the necessary wireless transmission band is reserved by the wireless transmission apparatus acting as the transmitting, it is possible to obtain the wireless transmission method in which the wireless transmission band can be additionally reserved in order to use more reliable modulation system and coding ratio according to the need.

According to a seventh aspect invention, in the wireless transmission method in which the wireless network comprised of a plurality of wireless transmission apparatus is constructed, the predetermined wireless transmission band is reserved and the wireless transmission is carried out, since the transmission error occurrence situation is measured by the wireless transmission apparatus acting as the receiving station of a plurality of wireless transmission apparatus, the modulation system and the convolutional coding ratio serving as the parameters for use in wireless transmission are decided based on the measured results and the modulation system and the convolutional coding ratio thus decided as the parameters are reported to the arbitrary wireless transmission apparatus excepting the receiving station of a plurality of wireless transmission apparatus, it is possible to obtain the wireless transmission method in which the wireless transmission band can be reserved according to the need.

According to the eighth aspect of the invention, in the wireless transmission method of the invention, since the modulation system and the convolutional coding ratio thus decided as the parameters are reported to the wireless transmission apparatus acting as the reserving station of the band reserve transmission of a plurality of wireless transmission apparatus and the necessary wireless transmission band is reserved by the wireless transmission apparatus acting as its reserving station, it is possible to obtain the wireless transmission method in which the wireless transmission band can be reserved according to the need.

According to a ninth aspect invention, in the wireless transmission method of the invention, since the modulation system arid the convolutional coding ratio thus decided as the parameters are reported to the wireless transmission apparatus acting as the control station of a plurality of wireless transmission apparatus and the necessary wireless transmission band is reserved by the wireless transmission apparatus acting as its control station, it is possible to obtain the wireless transmission method in which the wireless transmission band can be reserved according to the need.

According to a tenth aspect of the invention, in the wireless transmission method of the invention, since the modulation system and the convolutional coding ratio serving as the decided parameters are reported to the transmitting station of the band reserve transmission of a plurality of wireless transmission apparatus and the necessary wireless transmission band is reserved by the wireless transmission apparatus acting as its transmitting station, it is possible to obtain the wireless transmission method in which the wireless transmission band can be reserved according to the need.

According to an eleventh aspect of the invention, since the wireless transmission apparatus which constructs the wireless network and which reserves the predetermined wireless transmission band includes the mechanism for setting the desired transmission quality in the wireless transmission, it is possible to obtain the wireless transmission apparatus in which the wireless transmission band can be reserved according to the need when the predetermined transmission quality is not satisfied.

According to a twelfth aspect of the invention, since the wireless transmission apparatus which constructs the wireless network and which reserves the predetermined wireless transmission band includes the receiver for receiving an instruction from the application of the reserving station which executes the band reserved transmission and the means for setting the desired transmission quality based on the received instruction, it is possible to obtain the wireless transmission apparatus in which the allowable transmission error can be set.

According to a thirteenth aspect of the invention, in the wireless transmission apparatus which constructs the wireless network and in the wireless transmission apparatus acting as the wireless transmission apparatus of the receiving destination including the receiver for reserving the predetermined wireless transmission band, carrying out the wireless transmission and receiving the wireless transmission, since this wireless transmission apparatus includes the measuring mechanism for measuring the transmission error occurrence situation and the information transmitter for reporting the transmission error occurrence situation based on the measured results of the measuring mechanism, it is possible to obtain the wireless transmission apparatus in which the predetermined transmission error situation can be reported according to the need.

According to the fourteenth aspect of the invention, in the wireless transmission apparatus of the invention, since this wireless transmission apparatus includes the reporting mechanism for reporting the transmission error occurrence situation measured by the measuring mechanism to the application of the wireless transmission apparatus acting as the reserving station constructing the network and which reserves the band, it is possible to obtain the wireless transmission apparatus in which the predetermined transmission error situation can be reported according to the need.

According to the fifteenth aspect of the invention, since the wireless transmission apparatus of the invention includes the reporting mechanism for reporting the transmission error occurrence situation measured by the measuring mechanism to the application of the wireless transmission apparatus as the control station constructing the network, it is possible to obtain the wireless transmission apparatus in which the predetermined transmission error situation can be reported according to the need.

According to a sixteenth aspect of the invention, since the wireless transmission apparatus of the invention includes the reporting mechanism for reporting the transmission error occurrence situation measured by the measuring mechanism to the wireless transmission apparatus acting as the wireless transmission apparatus of the transmission source of the band-reserving transmission, it is possible to obtain the wireless transmission apparatus in which the predetermined transmission error situation can be reported according to the need.

According to a seventeenth aspect of the invention, in the wireless transmission apparatus which constructs the wireless network and in the wireless transmission apparatus acting as the wireless transmission apparatus of the receiving destination including the receiver for reserving the predetermined wireless transmission band, carrying out the wireless transmission and receiving the wireless transmission, since this wireless transmission apparatus includes the measuring mechanism for measuring the transmission error occurrence situation, the deciding mechanism for deciding the modulation system and the convolutional coding ratio serving as the parameters for use in wireless transmission and the information transmitter for reporting the modulation system and the convolutional coding ratio as the decided parameters, it is possible to obtain the wireless transmission apparatus in which the modulation system and the convolutional coding ratio serving as the parameters for use in wireless transmission can be decided.

According to the eighteenth invention, since the wireless transmission apparatus of the invention includes the reporting mechanism for reporting the transmission error occurrence situation measured by the measuring mechanism to the wireless transmission apparatus acting as the control station constructing the network, it is possible to obtain the wireless transmission apparatus in which the modulation system and the convolutional coding ratio serving as the parameters for use in transmission can be decided.

According to a nineteenth aspect of the invention, since the wireless transmission apparatus of the invention includes the reporting mechanism for reporting the transmission error occurrence situation measured by the measuring mechanism to the application of the wireless transmission apparatus as the reserving station constructing the network and which reserves the band, it is possible to obtain the wireless transmission apparatus in which the modulation system and the convolutional coding ratio serving as the parameters for use in wireless transmission can be decided.

According to a twentieth aspect of the invention, since the wireless transmission apparatus of the invention includes the reporting mechanism for reporting the transmission error occurrence situation measured by the measuring mechanism to the wireless transmission apparatus acting as the wireless transmission apparatus of the transmission source of the band-reserve transmission, it is possible to obtain the wireless transmission apparatus in which the modulation system and the convolutional coding ratio serving as the parameters for use in wireless transmission can be decided.

According to a twenty-first aspect of the invention, in the wireless transmission apparatus constructing the wireless network and in the wireless transmission apparatus for reserving the predetermined wireless transmission band and which carries out the wireless transmission, since this wireless transmission apparatus includes the receiver for receiving the report of the band-reserve transmission error occurrence situation from the wireless transmission apparatus constructing the wireless network and which acts as the wireless transmission apparatus of the receiving destination and the request generator for requesting the band reserve additional allocation based on the received report, it is possible to obtain the wireless transmission apparatus in which the band reserve additional allocation request necessary for the band reserve transmission can be issued.

According to a twenty-second aspect of the invention, since the wireless transmission apparatus constructing the wireless network and which acts as the control station for reserving the predetermined wireless transmission and carrying out the wireless transmission includes the mechanism for carrying out the band reserve allocation of the necessary wireless transmission band, it is possible to obtain the wireless transmission apparatus acting as the control station in which the band-reserve allocation of the necessary wireless transmission band can be carried out.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A wireless transmission method for use with a wireless network comprising a plurality of wireless transmission apparatuses and on which a predetermined wireless transmission band is reserved and a wireless transmission is carried out, the method comprising:

measuring a transmission error occurrence situation by a wireless transmission apparatus acting as a receiving station; and reporting a transmission error occurrence situation to art arbitrary wireless transmission apparatus among said plurality of wireless transmission apparatuses other than the wireless transmission apparatus acting as said receiving station based on said measured results, wherein a modulation system and a convolutional coding ratio serve as parameters for use in carrying out said wireless transmission, wherein reporting the transmission error occurrence situation includes reporting the transmission error occurrence situation to a wireless transmission apparatus acting as a reserving station of a band reserving transmission among said plurality of wireless transmission apparatuses, the wireless transmission apparatus acting as said reserving station determining the modulation in system and convolutional coding ratio parameters used in carrying out said wireless transmission, and reserving a necessary wireless transmission band.

2. A wireless transmission method for use with a wireless network comprising a plurality of wireless transmission apparatuses and on which a predetermined wireless transmission band is reserved and a wireless transmission is carried out, the method comprising:

measuring a transmission error occurrence, situation by a wireless transmission apparatus acting as a receiving station; and reporting a transmission error occurrence situation to an arbitrary wireless transmission apparatus among said plurality of wireless transmission apparatuses other than the wireless transmission apparatus acting as said receiving station based on laid measured results, wherein a modulation system and a convolutional coding ratio serve as parameters for use in wireless transmission, wherein reporting the transmission error occurrence situation comprises reporting the transmission error occurrence to a wireless transmission apparatus acting as a control station among said plurality of wireless transmission apparatuses, wherein the wireless transmission apparatus acting as said control station determining the modulation and convolutional coding ratio parameters used in carrying out said wireless transmission, and reserving a necessary wireless transmission band.

3. A wireless transmission method for use with a wireless network comprising a plurality of wireless transmission apparatuses and on which a predetermined wireless transmission band is reserved and a wireless transmission is carried out, the method comprising:

measuring a transmission error occurrence situation by a wireless transmission apparatus acting as a receiving station; and reporting a transmission error occurrence situation to an arbitrary wireless transmission apparatus among said plurality of wireless transmission apparatuses other than the wireless transmission apparatus acting as said receiving station based on said measured results, wherein a modulation system and a convolutional coding ratio serve ad parameters for use in wireless transmission, wherein reporting the transmission error occurrence situation includes reporting the transmission error occurrence to a wireless transmission apparatus acting as a transmitting station of a band reserving transmission among said plurality of wireless transmission apparatuses, the wireless transmission apparatus acting as said transmitting station determining the modulation and convolutional coding ratio parameters used in carrying out said wireless transmission; and reserving a necessary wireless transmission band.

4. A wireless transmission method for use on a wireless network constructed from a plurality of wireless transmission apparatus, the method comprising:

reserving a predetermined wireless transmission band;

carrying out a wireless transmission wherein a transmission error occurrence situation is measured by a wireless transmission apparatus acting as a receiving station among said plurality of wireless transmission apparatus, a modulation system and a convolutional coding ratio serving as parameters for use in transmission are determined based on the measured results and wherein an arbitrary wireless transmission apparatus other than the wireless transmission apparatus acting as the receiving station among said plurality of wireless transmission apparatus is informed of the modulation system and the convolutional coding ratio serving as the parameters thus determined; and reporting said modulation system and said convolutional coding ratio thus determined to a wireless transmission apparatus acting as a reserving station of a band reserve transmission among said plurality of wireless transmission apparatus, and reserving a necessary wireless transmission band by the wireless transmission apparatus acting as the reserving station.

5. A wireless transmission method for use on a wireless network constructed from a plurality of wireless transmission apparatus, the method comprising the steps of:

reserving a predetermined wireless transmission band;

carrying out a wireless transmission wherein a transmission error occurrence situation is measured by a wireless transmission apparatus acting as a receiving station among said plurality of wireless transmission apparatus, a modulation system and a convolutional coding ratio serving as parameters for use in transmission are determined based on the measured results and wherein an arbitrary wireless transmission apparatus other than the wireless transmission apparatus acting as the receiving station among said plurality of wireless transmission apparatus is informed of the modulation system and the convolutional coding ratio serving as the parameters thus determined; and reporting said modulation system and convolutional coding ratio serving as the parameters thus determined to a wireless transmission apparatus acting as a control station among said plurality of wireless transmission apparatuses, and reserving a necessary wireless transmission band by the wireless transmission apparatus acting as the control station.

6. A wireless transmission method for use on a wireless network constructed from a plurality of wireless transmission apparatus, the method comprising:

reserving a predetermined wireless transmission band;

carrying out a wireless transmission wherein a transmission error occurrence situation is measured by a wireless transmission apparatus acting as a receiving station among said plurality of wireless transmission apparatus, a modulation system and a convolutional coding ratio serving as parameters for use in transmission are determined based on the measured results and wherein an arbitrary wireless transmission apparatus other than the wireless transmission apparatus acting as the receiving station among said plurality of wireless transmission apparatus is informed of the modulation system and the convolutional ratio as the parameters thus determined; and reporting said modulation system and said convolutional coding ratio serving as the parameters thus determined to a transmitting station of a band reserve transmission among said plurality of wireless transmission apparatuses, and reserving a necessary wireless transmission band by said wireless transmission apparatus acting as the transmitting station.

\* \* \* \* \*